United States Patent
Olkkonen

(10) Patent No.: US 6,768,724 B1
(45) Date of Patent: Jul. 27, 2004

(54) MOBILE NETWORKS USING ATM SWITCHING

(75) Inventor: Mikko Olkkonen, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/380,405
(22) PCT Filed: Mar. 19, 1998
(86) PCT No.: PCT/FI98/00241
§ 371 (c)(1), (2), (4) Date: Oct. 8, 1999
(87) PCT Pub. No.: WO98/43456
PCT Pub. Date: Oct. 1, 1998

(30) Foreign Application Priority Data

Mar. 20, 1997 (FI) .................................................. 971178

(51) Int. Cl.$^7$ ................................................ H04B 7/00
(52) U.S. Cl. ................................ 370/310.1; 370/310.1; 370/310.2
(58) Field of Search ........................ 370/310.1, 310.2, 370/328, 331, 395.1, 465, 466, 94.1, 314

(56) References Cited

U.S. PATENT DOCUMENTS

| | | | |
|---|---|---|---|
| 5,195,090 A | * 3/1993 | Bolliger | 370/94.1 |
| 5,568,482 A | 10/1996 | Li et al. | 370/79 |
| 5,633,868 A | * 5/1997 | Baldwin | 370/331 |
| 5,684,791 A | 11/1997 | Raychaudhuri et al. | 370/278 |
| 5,751,702 A | * 5/1998 | Evans | 370/314 |
| 5,787,077 A | * 7/1998 | Kuehnel | 370/331 |

FOREIGN PATENT DOCUMENTS

| | | |
|---|---|---|
| EP | 708 572 | 4/1996 |
| EP | 731 620 | 9/1996 |
| EP | 796 022 | 9/1997 |
| EP | 801 513 | 10/1997 |
| WO | WO 94/28645 | 12/1994 |
| WO | WO 96/42176 | 12/1996 |
| WO | WO 97/47158 | 12/1997 |

* cited by examiner

Primary Examiner—Douglas Olms
Assistant Examiner—Robert W. Wilson
(74) Attorney, Agent, or Firm—Squire, Sanders & Dempsey L.L.P.

(57) ABSTRACT

The invention relates to telecommunication networks and particularly to mobile networks using Asynchronous Transfer Mode (ATM) transmission systems. The invention also relates to the control of mobility and call control functions in ATM systems. According to the invention, a network element (MSC/BSC) of a telecommunication network, such as a mobile network, which in a conventional telecommunication network architecture ensures the switching of circuit-switched connections, is provided with an ATM switching function. ATM switching functions are controlled with the same call and switching control operations (31) that are conventionally used e.g. for the control of a TDM switching field (32) in a PLMN network element. In a minimum implementation, an ATM switching field (301) provided with a suitable control interface (30) is simply arranged in place of or parallel with the TDM switching field. The switching network element thus becomes an ATM network node of a physical or a logical interface layer. PLMN level signalling, mobility management and call control are implemented using solutions offered by existing mobile networks and current PLMN network elements.

15 Claims, 4 Drawing Sheets

MOBILE NETWORKS USING ATM SWITCHING

FIELD OF THE INVENTION

The invention relates to telecommunication networks and particularly to mobile networks using ATM (Asynchronous Transfer Mode) transfer systems. The invention also relates to the control of mobility and call control functions in ATM systems.

BACKGROUND OF THE INVENTION

Two of the current development trends in telecommunication are mobile communication and broadband networks. The term broadband typically refers to a bit rate higher than 2 Mbit/s. Narrowband usually refers to a bit rate of 64 kbit/s or lower. Bit rates from 64 kbit/s to 2 Mbit/s are sometimes referred to as wideband. Broadband networks are attractive for at least two (compatible) reasons:

1) A single broadband network bearer divided among a plurality of users, few or none of whom need the whole bandwidth alone, can offer advantages concerning flexibility and the building of transfer systems.
2) Information to be transferred on separate transfer channels possibly demand broadband channels. Users need new high-quality services, which in turn require high bit rates. Such services include e.g. video conferences, high-speed data transmission, etc. A common denominator for these services is multimedia, which combines image, voice and data into one service.

Due to its numerous strengths, ATM (Asynchronous Transfer Mode) is chosen as the transmission technique in various standardized B-ISDN (Broadband Integrated Services Digital Network) protocol structures. In this connection the term 'transmission' refers to the use of ATM switching and multiplexing techniques in a data link layer (i.e. an OSI Layer 2, hereinafter referred to as an ATM layer) relaying end user traffic from a source to a destination within a network. Between the source and the destination are established virtual connections, which requires the network to have switching functions. Signalling and user information are normally conveyed by different virtual connections in an ATM layer. A virtual connection is identified in the ATM layer by a Virtual Path Identifier VPI and a Virtual Channel Identifier VCI.

In ATM information is conveyed segmented in fixed-length cells, the number of the cells in a time unit being proportional to the user's bandwidth requirements. Each 53-octet cell is divided into a 5-octet header and a 48-octet information field, as shown in FIG. 2.

The main purpose of the header is to identify a connection number for a cell sequence providing a virtual channel for a particular call. A plural number of virtual paths, which are multiplexed in the ATM layer, can be connected to one and the same physical layer (i.e. an OSI Layer 1), each path being identified by an 8-bit VPI at a User-to-Network Interface UNI and a 12-bit VPI at a network-node interface. Each path can comprise a plural number of virtual channels, each of which is identified by a 16-bit VCI. The header can also comprise other fields, such as a Header Error Control HEC, a Generic Flow Control GFC, a Cell Loss Priority CLP and a Payload Type PT.

The User-to-Network interface UNI between an ATM user terminal and an ATM switch (a private UNI) and between private and public ATM networks (a public UNI), together with a UNI signalling (and an ATM cell) related thereto, are defined at least in the following recommendations:

[1] ATM User-to-Network Interface Specification, version 3.1, ATM Forum, 1994;

[2] ATM User-to-Network Interface (UNI) Signalling Specification, version 4.0, ATM Forum, June 1994;

[3] ITU-T Recommendation Q.2931 (1994) Broadband Integrated Services Digital Network (B-ISDN), Digital Signalling System No. 2 (DSS 2), User-to-Network Interface (UNI) Layer 3 Specification for Basic Call/Connection Control. ITU-T.

In mobile networks, radio interfaces have conventionally been narrowband. Mobile network transmission systems have conventionally been implemented with circuit-switched connections using a star or tree network configuration. In order to increase the capacity and flexibility of transmission systems, different broadband packet switched transmission systems have also been proposed for mobile networks, e.g. in WO 9319559, WO 9400959 and EP 0366342. EP0426269 describes a mobile system in which base stations are connected via routers to ATM network switches. Virtual connections controlled by the base stations are established between the base stations through the ATN network. Elementary mobility management is based on routing tables, which are maintained at base stations and in ATM switches and updated as subscribers move. GB2268359 and EP 679042 describe an ATM-access network in which there are permanent ATM virtual connections (to speed up the call set-up) between base stations and a mobile network interface, said connections being allocated for each call separately.

A possible future development trend is that mobile systems will have a broadband radio interface. In this case the transmission system of the mobile system should also be broadband, a potential alternative being provided by the ATM technology.

A third development trend is the introduction of wireless data transmission (wireless ATM) and mobility management into ATM networks. However, a problem arising from this is that current B-ISDN and ATM standards in no way support the mobility management, subscriber authentication, call control, etc., required by mobile communication. To introduce into the ATM network such supplementary characteristics required by mobile communication would therefore seem to require considerable development and standardization of and significant changes to the existing ATM systems. The implementation of wireless ATM would thus become a slow and an expensive process.

BRIEF SUMMARY OF THE INVENTION

An object of the invention is to implement an ATM-transmission or an ATM-access network in a more flexible manner than before in mobile network architectures that conventionally use circuit-switched transmission systems.

Another object of the invention is to add wireless transmission and mobility to the ATM network, without significant changes to the existing ATM networks and standards.

An aspect of the invention is a telecommunication network, such as a mobile network, comprising mobile stations, base stations, at least one switching network element performing call control and switching, and an ATM switching function for a dynamic switching of virtual ATM transmission connections between the base stations and said at least one switching network element. The invention is characterized by said ATM switching function being arranged in said at least one switching network element and being controlled through an internal interface by a call control of the network element.

Another aspect of the invention is a wireless ATM network comprising mobile stations and at least one ATM switch to which base stations are connected through a network-to-user interface UNI. The invention is characterized by
the ATM network having at least one switching network element of another telecommunication network, such as a mobile network, to perform call control and switching control;
said switching network element being provided with an ATM switching function, which is controlled through an internal interface by the call control of the network element, for a dynamic switching of virtual ATM transmission connections between the base stations and said at least one switching network element.

A further aspect of the invention is a switching network element of a mobile network. The invention is characterized by the network element comprising an ATM switching function for a dynamic switching of virtual ATM transmission connections to base stations and by controlling the ATM switching function, through an internal interface, with a call control of the network element.

A still further aspect of the invention is a method according to claim 11.

In the invention a network element of a telecommunication network, such as a mobile network, which in conventional telecommunication network architecture performs the switching of circuit-switched connections, is provided with an ATM switching function. ATM switching functions are controlled by the same call control and switching control functions that are conventionally used e.g. for controlling a TDM switching field in a PLMN network element (Public Land Mobile Radio). In a minimum implementation, an ATM switching field provided with a suitable control interface is simply arranged in place of or parallel with the TDM switching field. The switching network element can thus be made, from the point of view of a physical and a logical interface layer, into one of the nodal points of the ATM network. As regards for instance PLMN-level signalling, mobility management and call control, the change is a transparent one, so said functions can be carried out applying solutions based on existing mobile networks and PLMN network elements, with only slight modifications. This reduces costs and enables even existing PLMN networks to be provided with an ATM transmission system. The invention also makes continuous evolution of the transmission system in telecommunication networks possible, because the use of ATM transmission can be further extended to other network elements, without changes being needed to higher level system solutions.

A telecommunication network element of the invention may comprise both a conventional TDM switching field and a new ATM switching field parallel with each other. This provides an advantageous solution for instance in a network evolution phase in which the telecommunication network comprises base stations or other network elements using both circuit-switched transmission and ATM transmission. The switching network element can in this situation be arranged to switch either a virtual ATM connection or a circuit-switched connection to a base station or other network element, depending on whether said base station or other network element supports ATM transmission or not.

The telecommunication network element of the invention functions in ATM layers according to ATM standards, signalling with other ATM devices (user terminals or ATM switches) in accordance with e.g. UNI signalling. The invention thus requires no changes to the ATM network signalling and its operation.

PLMN network elements of the invention can also be used for introducing mobility management and call control into a wireless ATM network. One or more PLMN network elements are arranged as a part of the ATM network and call control signalling is transparently transmitted through the ATM network. Since also the switching of virtual connections is performed in the PLMN network element, the rest of the ATM network is not required to have any features related to mobility management.

In a preferred embodiment of the invention, the PLMN element is connected to the ATM network through a UNI interface. The base stations are correspondingly connected to the ATM network through a UNI interface. The configuration of the ATM network can vary considerably. For instance, it is possible that each base station is connected through a UNI interface direct to a mobile services switching centre by an ATM switching function. For the mobile services switching centre the base stations are then ATM user terminals to which virtual connections can be switched. It is also possible that the base stations and the mobile services switching centre are connected to a base station controller by an ATM switching function through a UNI interface. For the base station controller the base stations and the mobile services switching centre are then ATM user terminals between which virtual connections can be switched. Both a mobile services switching centre and a base station controller may simultaneously comprise an ATM switching function.

The invention allows all special network elements and special functions related to wireless communication to be implemented into cellular radio networks using previously designed network elements and solutions. The designing of special solutions for a wireless ATM is thus avoided. The cellular network elements concerned are connected to the ATM network through a standard UNI interface, but the signalling between the cellular network elements takes place either transparently through the ATM network via said permanent virtual connections or separate signalling connections. The signalling related to wireless communication thus causes no changes in a standard ATM UNI protocol.

BRIEF DESCRIPTION OF THE DRAWINGS

In the following the invention will be described in greater detail with reference to the attached drawings, in which.

DESCRIPTION OF PREFERRED EMBODIMENTS

The present invention can be applied to all networks using broadband ATM technology, for introducing wireless communication and mobility management in the networks. The invention is correspondingly applicable to any telecommunication network for implementing a transmission system between network elements by using ATM technology. In the following the invention is described using mobile systems as examples.

A mobile communication system used as a whole, or the network elements of which are used, for implementing wireless ATM can be any cellular radio system or other radio system. Different cellular systems can differ from each other in relation to the number and the functions of different types of network elements. Cellular systems may comprise for instance only mobile services switching centres and base stations, or base station controllers as well. Signalling may also significantly vary between different cellular systems. Such differences are not, however, significant for the invention, because one of the advantages provided by the invention is particularly the possibility to maintain signalling and the network elements unchanged, except for the adding of the ATM switching function to one or more network elements. The control of ATM switching according to the invention may be performed through an internal control interface at the same stage of call set-up and by the same network element as specified in the system concerned.

Also the type of radio interface between base stations and mobile stations is not significant for the invention. The radio interface can be narrowband, broadband, TDMA or CDMA, satellite, an interface according to a current standard (e.g. the GSM) or an interface according to a future standard (e.g. the UMTS).

In the following description of preferred embodiments of the invention, the European digital cellular mobile communication system GSM (Global System for Mobile Communication) is used as an example. The basic structural parts of a GSM system are defined in GSM recommendations. As to the most significant description of the GSM system, reference is made to the GSM recommendations and to M. Mouly and M. Pautet, The *GSM System for Mobile Communications*, Palaiseau, France, 1992, ISBN:2-9507190-07-7.

Figure 1:
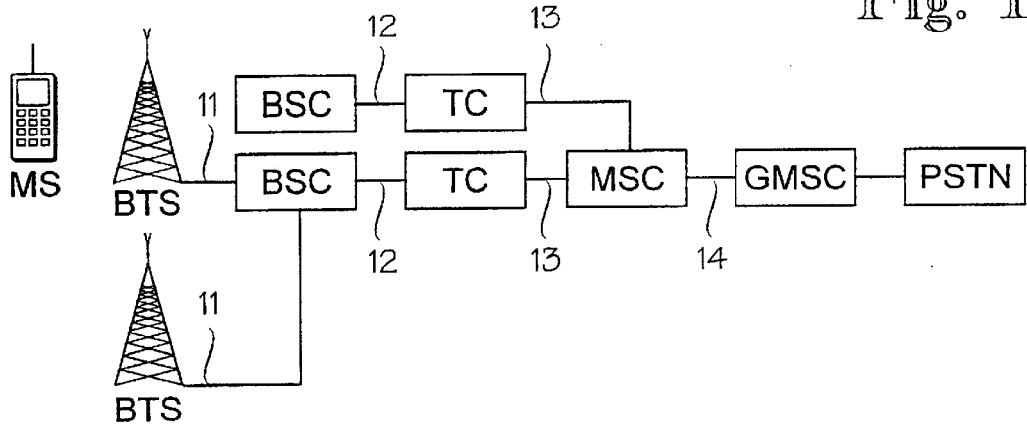
FIG. 1 illustrates a basic architecture for a telecommunication system in which the present invention can be applied.
Figure 2:
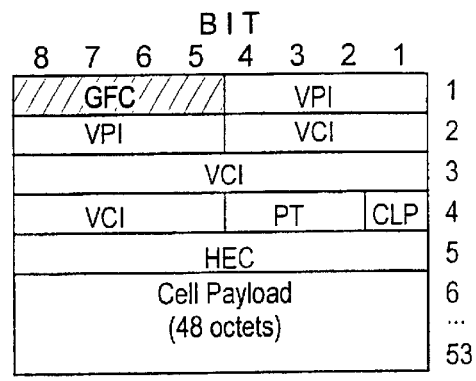
FIG. 2 illustrates a structure of an ATM cell.

FIG. 1 illustrates a conventional GSM network comprising mobile stations MS, base stations BTS, base station controllers BSC and mobile services switching centres MSC. Special functions of mobile network, such as call control, mobility management and a control of radio resources, are implemented in PLMN network elements BTS, BSC and MSC. The MSC performs call set-up, call switching and call control. The base station system comprises a base station controller BSC and base stations BTS. The base station controller BSC is used to control a plural number of base stations. The BSC can also control handover between two base stations connected to it. For the BSC is defined an A interface to the MSC and an Abis interface to the base station BTS. The interfaces are defined in the GSM recommendation. The base stations BTS offer an radio interface through which the mobile stations MS are switched to the BSC and the MSC.

To the mobile network PLMN are also switched other network elements, such as subscriber data bases HLR (Home Location Register) and VLR (Visitor Location Register) and an operation and maintenance centre OMC, which are not shown in FIG. 1. In the home location register HLR are permanently stored subscriber data and data on the visitor location register VLR in the area of which the mobile station is located at a particular time. The subscriber data of subscribers visiting the VLR area are temporarily copied into the visitor location register VLR. At least one MSC provides a gateway to another network, such as PSTN. This type of MSC is called a Gateway-MSC. FIG. 1 also shows, as a separate element, a transcoder TC, which performs various speech transcoding and speed adjustment operations. The TC is operationally between the BSC and the MSC, but physically it is often arranged in connection with the MSC. The transcoder TC is not essential to the invention, but it is included in the present description to illustrate different network configurations. The transcoder TC may optionally be a part of another network element, such as an MSC.

GSM network elements can be classified, according to the nature of the network elements, into switching network elements and transmission network elements. A switching network element has a capability (a switching field) to dynamically and selectively switch connections between transmission network elements. Transmission network elements function as transmission terminals transmitting and receiving user information. The MSC and the BSC are typically switching network elements in character, whereas the MS, BTS and TC are typically transmission terminals in character.

In the conventional GSM network shown in FIG. 1, transmission links 11 between BTS-BSC, transmission links 12 between BSC-TC, transmission links 13 between TC-MSC and (trunking) transmission links 14 (e.g. MSC-GMSC) between exchanges are circuit-switched PCM links. The BSC, MSC and GMSC comprise a time-division multiplexed (TDM) switching field for a selective switching of the circuits of the different PCM links to each other. As stated above, in order to increase capacity and flexibility in the transmission systems of mobile networks, it has also been proposed that ATM technology would be used in mobile networks. In the proposed solutions, transmission links 11 to 14 of FIG. 1 are replaced with an ATM transmission network provided with its own ATM switch (switches) for switching virtual connections between different network elements.

Figure 3:
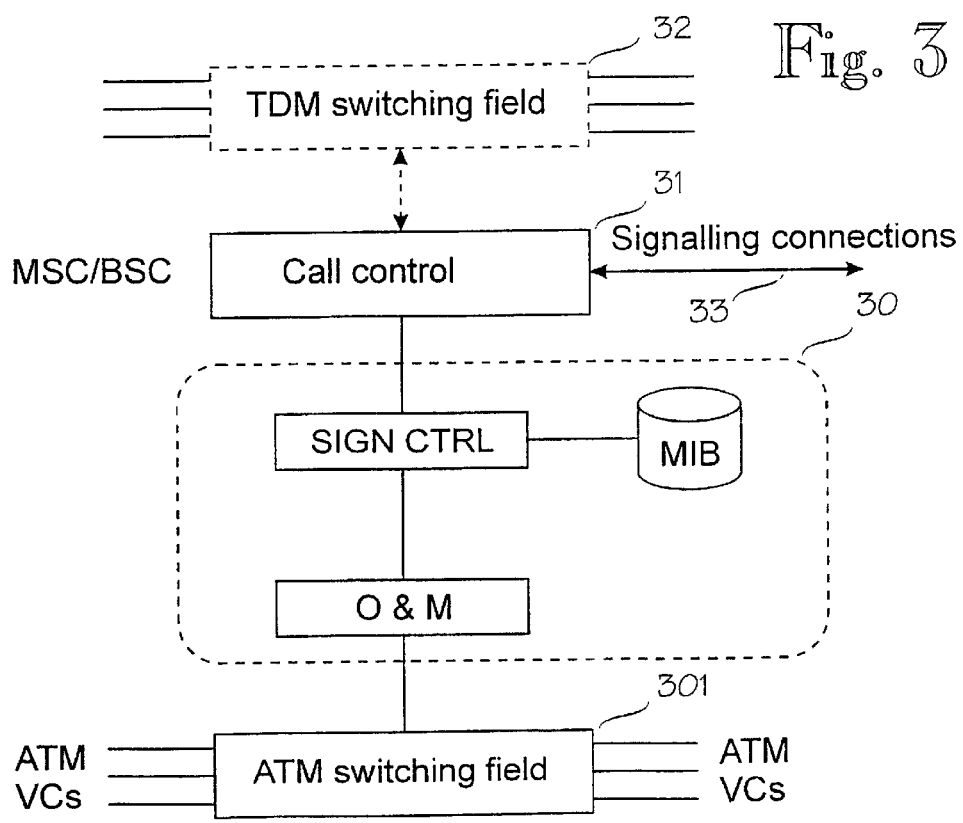
FIG. 3 is a block diagram illustrating a switching network element of the invention.

According to a basic principle of the invention, a switching network element of a PLMN network, such as an MSC or a BSC, is provided with an ATM switching field, which replaces a conventional TDM switching field or operates parallel with it. FIG. 3 shows an MSC or a BSC according to the invention. From a conventional MSC/BSC FIG. 3 shows call control 3, described only as a functional block representing all resources in general that can relate to call switching: call control, mobility management, radio resources management, etc. The call control 3 has signalling connections 33 (e.g. SS7) to other network elements. The signalling connections can run entirely outside the ATM layer. The signalling connections 33 are, however, preferably permanent ATM virtual connections, through which PLMN signalling is transparently transferred in a payload of ATM cells. As will be illustrated with examples given below, all PLMN signalling through the signalling connections 33 in the preferred embodiment of the invention is fully in accordance with the GSM recommendations.

The MSC/BTS in FIG. 3 is further provided with an ATM switching field (a matrix) 301 which the call control 3 controls through an interface unit 30. The interface unit 30 in the embodiment of FIG. 3 comprises the following functional elements: a Management Information Base MIB, an ATM signalling control SIGN.CTRL and an operational and maintenance interface O&M to the switching matrix 301. The ATM signalling control SIGN.CTRL ensures a UNI signalling according to references [1] and [2] and controls switching operations of the switching matrix 301 through the O&M interface. In the Management Information Base MIB are maintained status and configuration information (management information) on virtual path and virtual channel connections that are available for use at the UNI interfaces of the ATM switch. Management information types available in the MIB are e.g. the following: a physical layer; an ATM layer; ATM layer statistics; Virtual Path Connections VPC; Virtual Channel Connections VCC; and address recording information.

All interfaces between the ATM switching matrix 301 and the other network elements (BTS, BSC, MSC, TC and/or the ATM network switch) are user-to-network interfaces UNI. The UNI interface is defined in connection with references [1], [2] and [3]. For the ATM switching matrix, the PLMN network elements connected to it through the UNI interface thus represent conventional ATM devices (users) or ATM switches which it can reach via the UNI interface. PLMN network elements without an ATM switching function are provided with an ATM interface device, which provides a UNI interface to the ATM network 3 and a PLMN interface to the network element.

The MSC/BSC of the invention can comprise, in addition to the ATM switching matrix 301, also a conventional TDM switching matrix 32, as shown with a dashed line in FIG. 3. This solution can be applied for instance when other network elements are connected to the MSC/BSC, both with circuit-switched connections and with ATM technology, and the MSC/BSC is to be able to switch calls using both techniques. The MSC/BSC chooses the switching technique to be used at a particular time according to whether the other network element supports ATM technology or not.

Figure 4:
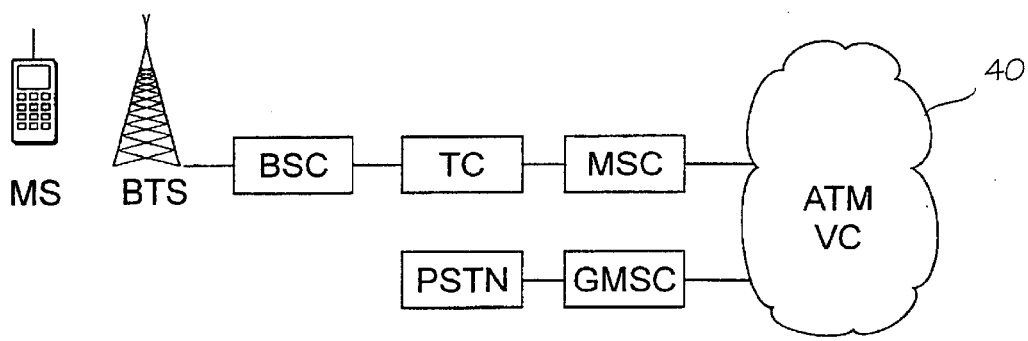
FIGS. 4 to 6 illustrate different GSM network architectures in which ATM technology is applied.
Figure 5:
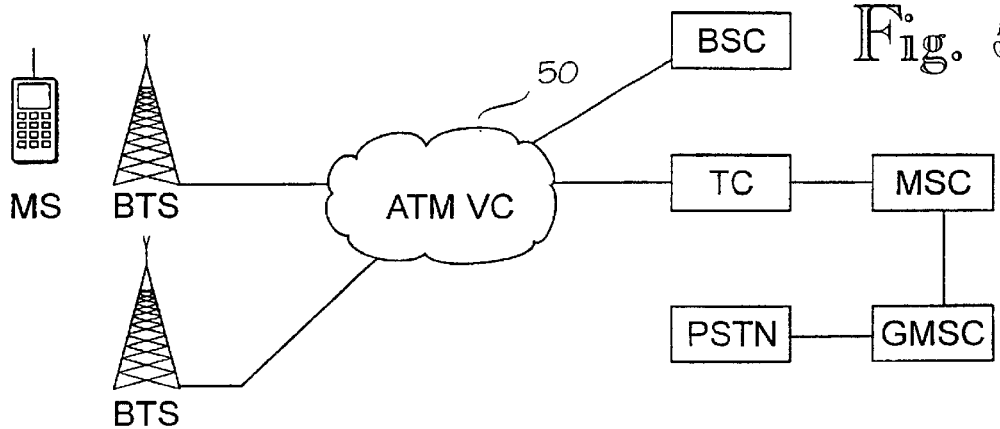
Figure 6:
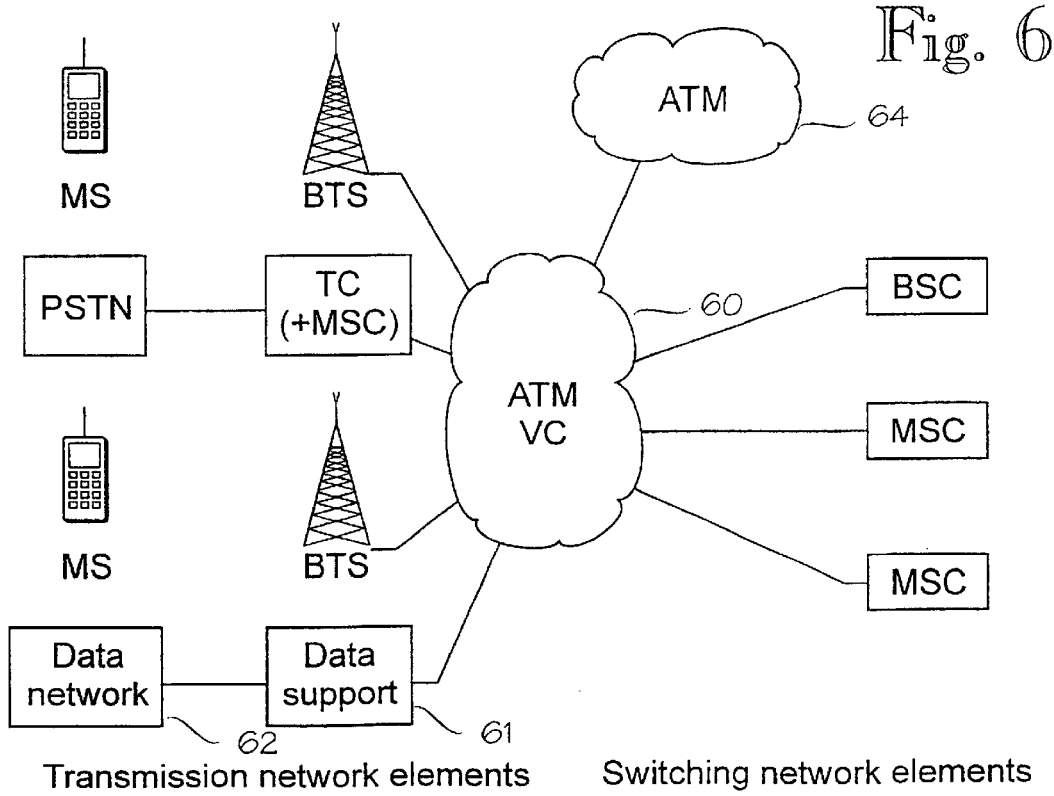

FIGS. 4 to 6 illustrate different stages of evolution of the GSM network architecture when ATM technology is applied. In FIG. 4 ATM technology is used on the transmission connections between exchanges (using virtual trunking ATM). In other words, the transmission links 14 of FIG. 1 are replaced with ATM technology. In FIG. 5 the circuit-switched transmission links 11 and 12 (FIG. 1) between the base station controller BSC and the base stations BTS and the transcoder TC are replaced with virtual ATM connections. The BSC is provided with an ATM switching function. In FIG. 6 all transmission links 11 to 14 (FIG. 1) are replaced with virtual ATM connections. FIG. 6 also describes best the method of approach applied in the present invention. The base station controllers BCS and the switching centres MSC (switching network elements in character) are provided with an ATM switching feature so as to enable them to switch virtual ATM connections between the base stations BTS and the transcoders TC and other transmission type network elements. FIG. 6 shows a data support 61 also as a network element, said support usually denoting some kind of a router, gateway or the like to a data network 62. The operation in question can be for instance the connecting of a General Packet Radio System (GPRS) network to a GSM network. An ATM transmission network 40, 50 or 60 in FIGS. 4 to 6 can be a normal ATM network comprising also actual ATM switches. The ATM network 60 can also be connected to other ATM networks 2, such as B-ISDN, or to other data networks 4, such as N-ISDN, PSDN (e.g. X.25) or the Internet.

An ATM network 40, 50 and 60 may advantageously be a standard ATM network into which a wireless ATM concept has been created using a network architecture and PLMN network elements provided with an ATM switching capability of the invention. The architecture of a probable wireless ATM network is of the type in FIG. 6.

With a further reference to FIG. 3, the call control 3 controls the switching matrix by manipulating at the interface unit 30 the management information related to the parameters of the ATM layers and the physical layer. The interface unit 30 performs the establishment, maintenance and releasing of the virtual connections fully in accordance with UNI signalling.

In the following, an example of call switching will be described with reference to FIG. 7, said switching being performed using a telecommunication network element of the invention provided with an ATM switching function. The example is applicable to e.g. a network architecture according to FIG. 5, in which the BSC is a network element provided with an ATM switching function. The example describes a handover (of a call) between two BTSs which are switched to one and the same BSC that decides when handover is to be performed (similarly as in the GSM system). The described mobile network signalling is in accordance with GSM signalling. It is, however, to be understood that the example is only intended to illustrate a method of how a network element according to the invention is able to switch virtual ATM connections between two points. The invention is not dependent on the telecommunication system or network element in which, or on the type of network signalling in connection with which the invention is to be applied.

As known from before, an MS measures, in addition to a serving base station, downlink signals from a particular group of neighbouring base stations. The MS regularly reports the measurement results to a base station controller BSC which makes a decision on handover on the basis of the results. FIG. 7 shows an MS sending to the currently serving base station BTS_o (referred to hereinafter as an old base station) the measurement report in a measurement report message. The BTS_o transmits the measurement report to the BSC in ATM cells through a permanent virtual connection PVC2.

Let us now assume that on the basis of the measurement results sent by the MS (and according to the handover algorithm used), the BSC makes a decision that a call should be handed over from the old base station BTS_o to a new base station BTS_n.

The BSC allocates the necessary radio resources to the connection and commands the new base station BTS_n to activate a traffic/radio channel with a CHANNEL_ ACTIVATION message. In the preferred embodiment of the invention, each radio channel of the base station BTS has a predetermined address and a port in the ATM adjusting element of the base station and at the UNI interface. The BTS n can thus switch the allocated traffic/radio channel to the correct ATM connection. Let us assume that the address of the traffic/radio channel thus allocated is addr_1, the predetermined VPI/VCI values related to which the BTS_n acknowledges by sending a message CHANNEL_ACTI- VATION_ACK.

The BSC sends to the old base station BTS_o a HANDOVER_COMMAND message, which comprises the information about the new base station BTS_n. A handover according to the GSM recommendations is then performed from the old base station to the new base station. As a result of the handover, the radio interface traffic channel allocated for the call at the new base station BTS_n is switched to the logical connection established between the BSC and the new base station BTS_n. The GSM signalling related to the handover is not essential to the invention and will not 9 therefore be described here in any detail. For a more detailed description of the messages presented in FIG. 7, reference is made to the above mentioned book and to the GSM recommendations.

After the BSC has received from the new base station BTS_n the information (HANDOVER_COMPLETE) of the handover having been completed on the radio path, the BSC switches the call from the virtual connection of the old base station BTS_o to the virtual connection of the new base station BTS_n and releases the virtual connection of the old base station BTS_o. The related ATM signalling is illustrated in FIG. 7 with blocks 70 and 80, shown with a dashed line. The signalling of blocks 70 and 80 is also illustrated in FIG. 8 and, correspondingly, in FIG. 9, which also provide an example of the messages exchanged between the elements inside the BSC of FIG. 3. It is to be noted, however, that the internal function and structure of the BSC can be freely implemented and they are in no way restricted to the examples shown in FIGS. 3, 8 and 9.

Figure 7:
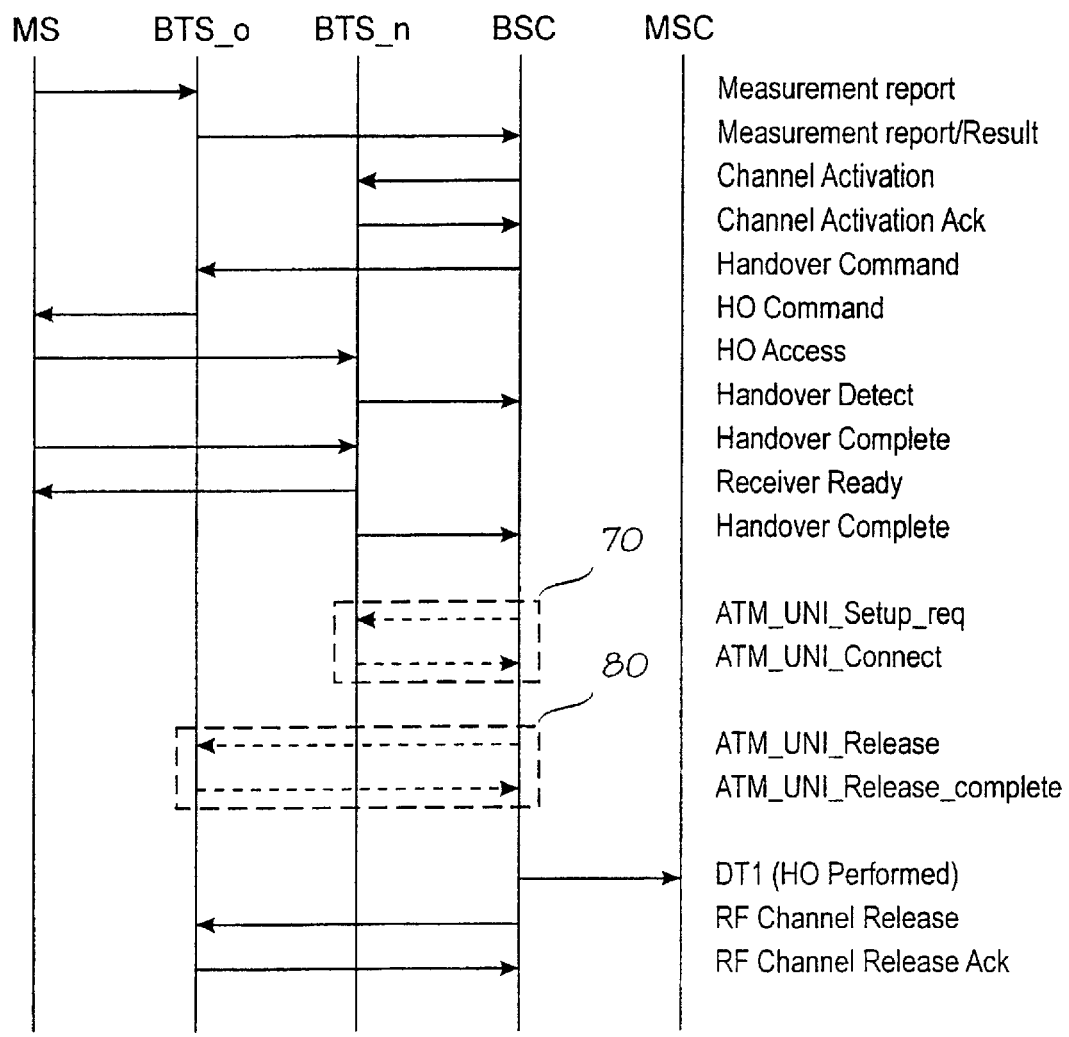
FIGS. 7, 8 and 9 are signalling diagrams illustrating a switching of an ATM connection of the invention.
Figure 8:
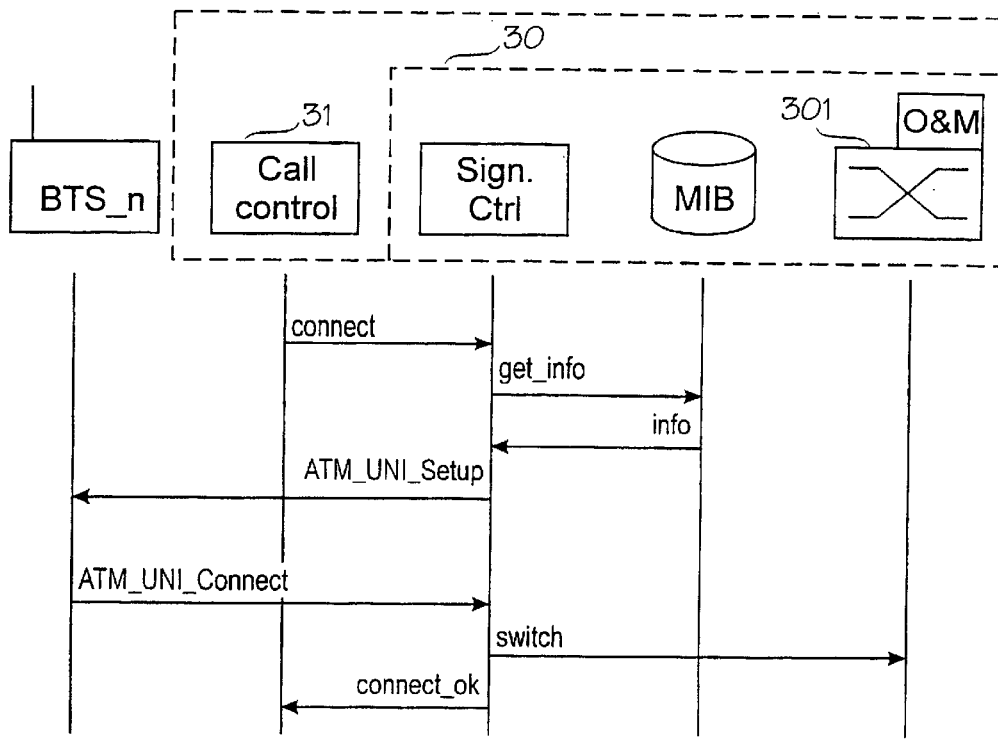

With reference to FIGS. 7 and 8, the call control 31 (FIG. 3) of the BSC issues the interface unit 30 a command to switch the traffic channel as a virtual circuit between the base station BTS_n and the BSC. To be precise, the call control 31 sends a connect command to the signalling control unit SIGN-CTRL. The connect command comprises as parameters the addresses addr_1 of the new base station BTS_n and addr_2 of the other party (e.g. the TC). The addresses can be ATM or E.164 addresses. The signalling control unit SIGN-CTRL then inquires of the MIP data base with a command get_info the ports (of the ATM switching matrix 301) to which the addresses addr_1 and addr_2 are connected to. The MIP provides in an info response the port numbers and the VPI/VCI values that should be used for the connections. The signalling control SIGN-CTRL then carries out a normal ATM connection set-up procedure. In other words, the signalling unit SIGN-CTRL sends to the new base station BTS_n a message ATM_UNI_Setup. The BTS_n accepts the call by sending a message ATM_UNI_Connect. Since a virtual connection to the other party already exists, it does not have to be established again in this example. The signalling unit SIGN-CTRL commands through the O & M interface (with a switch command) the switching matrix 301 to switch the VPI/VCI of the new base station BTS_n to the VPI/VCI of the other party. The SIGN-CTRL then issues to the call control 31 an acknowledgement connect_ok.

Figure 9:
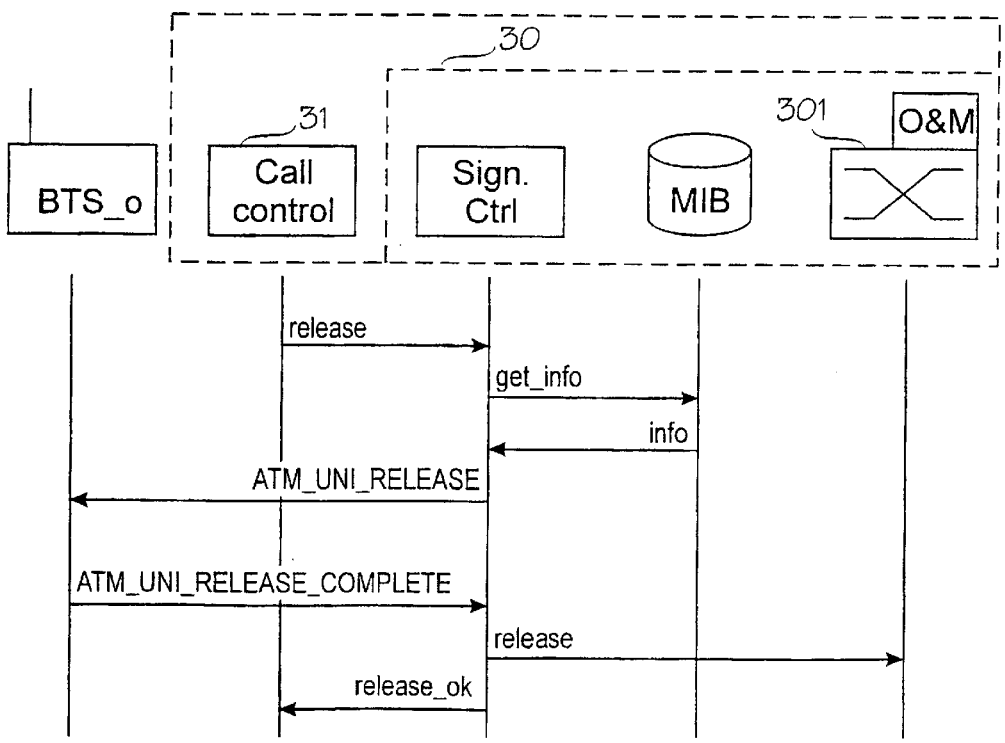

With reference to FIGS. 7 and 9, the call control 31 of the BSC issues to the interface unit 30 a command to release the virtual connection between the old base station BTS_o and the BSC. To be precise, the call control 31 sends a release command to the signalling control unit SIGN-CTRL. The connect command comprises as parameters an address addr_3 of the traffic/radio channel allocated at the old base station BTS_o. The signalling control unit SIGN-CTRL then inquires of the MIP data base with a command get_info the port (of the ATM switching matrix 301) to which the addr_3 is connected to. The MIP provides in an info response the port number and the VPI/VCI values used for the connection. The signalling control SIGN-CTRL then carries out a normal ATM connection release procedure. In other words, the signalling unit SIGN-CTRL sends to the old base station BTS_o a message ATM_UNI_Release and the BTS_o acknowledges by sending a message ATM_UNI_Release_Completed. The SIGN_CTRL issues to the ATM switching matrix 301 a release command, which releases the virtual connection of the old base station BTS_o from the connection to the other party. The SIGN-CTRL then issues to the call control 31 an acknowledgement release_ok.

The BSC informs the MSC about the handover being performed and then commands the old BTS_o to release the radio channel resources by sending a GSM message RF_CHANNEL_RELEASE. The BTS_o sends an acknowledgement message RF_CHANNEL_RELEASE_ACK. The handover is now completed.

When the MSC/BSC needs to set up virtual connections to both the parties before the switching (e.g. in connection with call set-up), it sends the above described message ATM_UNI_Setup to both parties, who both respond with the message ATM_UNI_Connect. The other party can be, in addition to a PLMN network element, an ATM switch or an ATM terminal.

The attached drawings and the related description are only meant to illustrate the present invention. The details of the invention can vary within the scope and spirit of the attached claims.

What is claimed is:

1. A mobile communication network comprising mobile stations, base stations and at least one switching element,
said switching element comprising a call control unit for implementing call control and mobility management signalling of the mobile communication network, an ATM switching function for a dynamic switching of ATM transmission connections between the base stations and the switching element, and an interface unit connected to the call control unit and to the ATM switching function;
which said interface unit comprises an operation and maintenance interface for facilitating information flow to and from the ATM switching function, a management information base for maintaining management information on virtual path and virtual channel connections of the ATM switching function, and an ATM signalling control unit for implementing ATM signalling of the ATM transmission connections, and for controlling the ATM switching function through the operation and maintenance interface, and
said call control unit is further configured to control the ATM switching function by manipulating at the interface unit the management information of the ATM layers and the physical layer.

2. A wireless ATM network comprising base stations, at least one ATM switch to which base stations are connected through a user-to-network interface and at least one switching element comprising a time-division multiplexed switching field for switching of connections of the mobile communication network, an ATM switching function, for dynamic switching of ATM transmission connections between the base stations and the switching element, a call control unit for implementing signalling of the mobile communication network related to establishing, maintaining or releasing a call in the mobile communication network, and an interface unit connected to the call control unit and the ATM switching function,
wherein said interface unit comprises an operation and maintenance interface for facilitating information flow to and from the ATM switching function, a management information base for maintaining management information on virtual path and virtual channel connections of the ATM switching function, and an ATM signalling control unit for implementing ATM signalling of the ATM transmission connections, and for controlling the ATM switching function through the operation and maintenance interface; and
said call control unit is further configured to control the ATM switching function by manipulating at the interface unit the management information of the ATM layers and the physical layer.

3. A network according to claim 1, wherein signalling connections for call control and mobility management between the switching network element and base stations are implemented as permanent ATM virtual connections and transparent to the ATM switching function.

4. A network according to claim 3, wherein said signalling connections for call control and mobility management between the switching network element and base stations are implemented as permanent ATM virtual channels between the base stations and the switching network element.

5. A network according to claim 1, wherein a user-to-network interface is provided between the base stations and the switching network element.

6. A network according to claim 1, wherein said mobile communication network comprises also base stations or other network elements switched to said switching network element with time-division transmission links and said switching network element also comprises a time-division multiplexed switching field for switching circuit-switched connections of the mobile communication network.

7. A network according to claim 6, wherein said switching network element is arranged to switch to the base station or another network element either a virtual ATM connection or a circuit-switched connection, depending on whether said base station or other network element supports ATM transmission or not.

8. A network according to claim 1, wherein said at least one switching network element comprises a mobile services switching center and/or a base station controller.

9. A network according to claim 1, wherein the signalling control unit of the switching element, is configured to perform, in response to a command from the call control unit for setting up, releasing or re-switching a channel for a call of the mobile communication network, a standard UNI signalling procedure for setting up, releasing or re-switching a logical virtual channel between the base station and the switching element for the call.

10. A method for mobility management and call control in a wireless ATM network comprising mobile stations, base stations and at least one ATM switch to which base stations are switched through a user-to-network interface, the method comprising:

connecting said ATM switch to a separate switching element of a mobile communications network, said switching element comprising a call control unit for implementing call control and mobility management signalling of the mobile communication network, an ATM switching function for dynamic switching of ATM transmission connections between the base stations and the switching element, and an interface unit connected to the call control unit and to the ATM switching function;

performing the functions related to call control and mobility management in said separate switching element of a mobile communications network;

generating in the interface unit in response to the functions performed by the call control unit, user-to-network interface signalling related to the mobility management and call control;

establishing call-specific logical virtual channels between the base stations and the switching element by means of the ATM switching function, in response to the generated user-to-network interface signalling, transparently transmitting through the ATM network the signalling related to the mobility management and call control on permanent, logical virtual channels between the base stations and said switching element of a mobile communications network.

11. A method for mobility management and call control in a mobile communications network comprising mobile stations, base stations, at least one switching network element comprising a call control unit for implementing call control and mobility management, signalling of the mobile communication network, an ATM switching function for dynamic switching of ATM transmission connections between the base stations and the switching element, and an interface unit connected to the call control unit and to the ATM switching function;

performing the functions related to the call control and mobility management in said switching element of a mobile communications network;

generating in the interface unit, in response to the functions performed by the call control unit, user-to-network interface signalling related to the mobility management and call control;

establishing, in response to the generated user-to-network interface signalling, call specific logical virtual channels between the base stations and the switching element, by means of the ATM switching function;

transparently transmitting through the ATM network the signalling related to the mobility management and call control on permanent, logical virtual channels between the base stations and said switching element of a mobile communications network.

12. A switching network element of a mobile network, wherein the network element comprises a call control unit for implementing call control and mobility management signalling of the mobile communication network, an ATM switching function for a dynamic switching of ATM transmission connections to between the base stations and the switching element, and an interface unit connected to the call control unit and to the ATM switching function;

wherein said interface unit comprises an operation and maintenance interface for facilitating information flow to and from the ATM switching function, a management information base for maintaining management information on virtual path and virtual channel connections of the ATM switching function, and an ATM signalling control unit for implementing ATM signalling of the ATM transmission connections, and for controlling the ATM switching function through the operation and maintenance interface, and said call control unit is further configured to control the ATM switching function by manipulating at the interface unit the management information of the ATM layers and the physical layer.

13. A network element according to claim 12, comprising also a time-division switching field for switching circuit-switched connections.

14. A network element according to claim 13, wherein the element is arranged to switch to the base station or other network element either a virtual ATM connection or a circuit-switched connection, depending on whether said base station or other network element supports ATM transmission or not.

15. A network element according to claim 12, comprising a mobile services switching centre and/or a base station controller.

* * * * *